United States Patent
Shimizu et al.

(10) Patent No.: US 11,511,667 B2
(45) Date of Patent: Nov. 29, 2022

(54) SURROUNDING VEHICLE DISPLAY METHOD AND SURROUNDING VEHICLE DISPLAY DEVICE

(71) Applicant: Nissan Motor Co., Ltd., Kanagawa (JP)

(72) Inventors: Youji Shimizu, Kanagawa (JP); Tetsuya Yamamoto, Kanagawa (JP); Seiko Kawai, Kanagawa (JP); Katsumi Kimura, Kanagawa (JP); Ryusuke Ueki, Kanagawa (JP)

(73) Assignee: Nissan Motor Co., Ltd., Kanagawa (JP)

(*) Notice: Subject to any disclaimer, the term of this patent is extended or adjusted under 35 U.S.C. 154(b) by 299 days.

(21) Appl. No.: 16/641,912

(22) PCT Filed: Aug. 25, 2017

(86) PCT No.: PCT/JP2017/030483
§ 371 (c)(1),
(2) Date: Feb. 25, 2020

(87) PCT Pub. No.: WO2019/038904
PCT Pub. Date: Feb. 28, 2019

(65) Prior Publication Data
US 2020/0247319 A1 Aug. 6, 2020

(51) Int. Cl.
*G09G 5/00* (2006.01)
*B60R 1/00* (2022.01)
(Continued)

(52) U.S. Cl.
CPC .............. *B60R 1/00* (2013.01); *G06T 3/0006* (2013.01); *B60R 2300/30* (2013.01);
(Continued)

(58) Field of Classification Search
CPC ......... G06T 11/60; G06T 19/00; G06T 11/00; G06F 9/4443; G06F 3/0481; A63F 2300/6684
(Continued)

(56) References Cited

U.S. PATENT DOCUMENTS

2003/0021490 A1  1/2003  Okamoto et al.
2009/0132162 A1*  5/2009  Kudoh ................. G08G 1/0969
                                              701/533
(Continued)

FOREIGN PATENT DOCUMENTS

JP   2002-125224 A   4/2002
JP   2009-062020 A   3/2009
(Continued)

*Primary Examiner* — Gordon G Liu
(74) *Attorney, Agent, or Firm* — Osha Bergman Watanabe & Burton LLP

(57) ABSTRACT

A surrounding vehicle display device includes: a surrounding information detection device that obtains information on surroundings of a host vehicle; and a vehicle speed sensor that detects a vehicle speed of the host vehicle. The surrounding vehicle display device includes a controller that uses the information obtained by the surrounding information detection device to generate a virtual image that indicates the surroundings of the host vehicle as being viewed from above the host vehicle and a display displays the virtual image. The controller makes a display region of at least a rear region around the host vehicle on the virtual image wide when the vehicle speed detected by the vehicle speed sensor is higher than a low vehicle speed.

11 Claims, 4 Drawing Sheets

(51) Int. Cl.
 *G06T 3/00* (2006.01)
 *G05D 1/00* (2006.01)
 *G08G 1/16* (2006.01)

(52) U.S. Cl.
 CPC ... *B60R 2300/605* (2013.01); *B60R 2300/607* (2013.01); *B60R 2300/8033* (2013.01); *G05D 1/0088* (2013.01); *G08G 1/165* (2013.01); *G08G 1/166* (2013.01)

(58) Field of Classification Search
 USPC .......................................................... 345/619
 See application file for complete search history.

(56) References Cited

U.S. PATENT DOCUMENTS

| | | | |
|---|---|---|---|
| 2016/0321920 | A1 | 11/2016 | Hayasaka et al. |
| 2016/0332574 | A1* | 11/2016 | Park ........................ H04N 7/181 |
| 2018/0286095 | A1* | 10/2018 | Kusayanagi .............. B60R 1/00 |
| 2020/0209959 | A1* | 7/2020 | Oniwa .................... G06T 13/80 |

FOREIGN PATENT DOCUMENTS

| | | | |
|---|---|---|---|
| JP | 2012-195793 A | | 10/2012 |
| JP | 2012195793 A | * | 10/2012 |
| JP | 2015-015527 A | | 1/2015 |
| JP | 2015-139128 A | | 7/2015 |
| JP | 2017-166913 A | | 9/2017 |

* cited by examiner

SURROUNDING VEHICLE DISPLAY METHOD AND SURROUNDING VEHICLE DISPLAY DEVICE

TECHNICAL FIELD

The present invention relates to a surrounding vehicle display method and a surrounding vehicle display device.

BACKGROUND ART

Conventionally, there is known a method of displaying an image of a host vehicle and the surroundings of the host vehicle as being viewed from a virtual viewpoint (Patent Literature 1). The invention according to Patent Literature 1 sets a position and a direction of the virtual viewpoint to widen a front region around the host vehicle as a vehicle speed of the host vehicle increases, and generates a display image based on the set position and direction of the virtual viewpoint.

CITATION LIST

Patent Literature

Patent Literature 1: Japanese Patent Application Publication No. 2012-195793

SUMMARY OF INVENTION

Technical Problem

The invention according to Patent Literature 1 considers widening the front region around the host vehicle as the vehicle speed of the host vehicle increases. However, the invention according to Patent Literature 1 does not consider widening right and left regions and a rear region around the host vehicle as the vehicle speed of the host vehicle increases. For this reason, in the invention according to Patent Literature 1, in a case where the vehicle speed of the host vehicle is increased, it is more difficult for an occupant to grasp another vehicle, a bike, a bicycle, a pedestrian, and the like in a wider area of the right and left regions and the rear region around the host vehicle than a case where the vehicle speed of the host vehicle is low.

The present invention is made in light of the above-mentioned problem, and the object is to provide a surrounding vehicle display method and a surrounding vehicle display device that allow an occupant to grasp another vehicle, a bike, a bicycle, a pedestrian, and the like in a wider region around a host vehicle when a vehicle speed of the host vehicle is higher than a low vehicle speed.

Solution to Problem

A surrounding vehicle display method according to an aspect of the present invention obtains information on the surroundings of a host vehicle and detects a vehicle speed of the host vehicle. The surrounding vehicle display method uses the obtained information on the surroundings of the host vehicle to generate a virtual image that indicates the surroundings of the host vehicle as being viewed from above the host vehicle. The surrounding vehicle display method makes a display region of at least a rear region around the host vehicle on the virtual image wide when the detected vehicle speed is higher than a low vehicle speed.

Advantageous Effects of Invention

According to the present invention, an occupant can grasp another vehicle, a bike, a bicycle, a pedestrian, and the like in a wider region around a host vehicle when a vehicle speed of the host vehicle is higher than a low vehicle speed.

DESCRIPTION OF EMBODIMENTS

Figure 1:
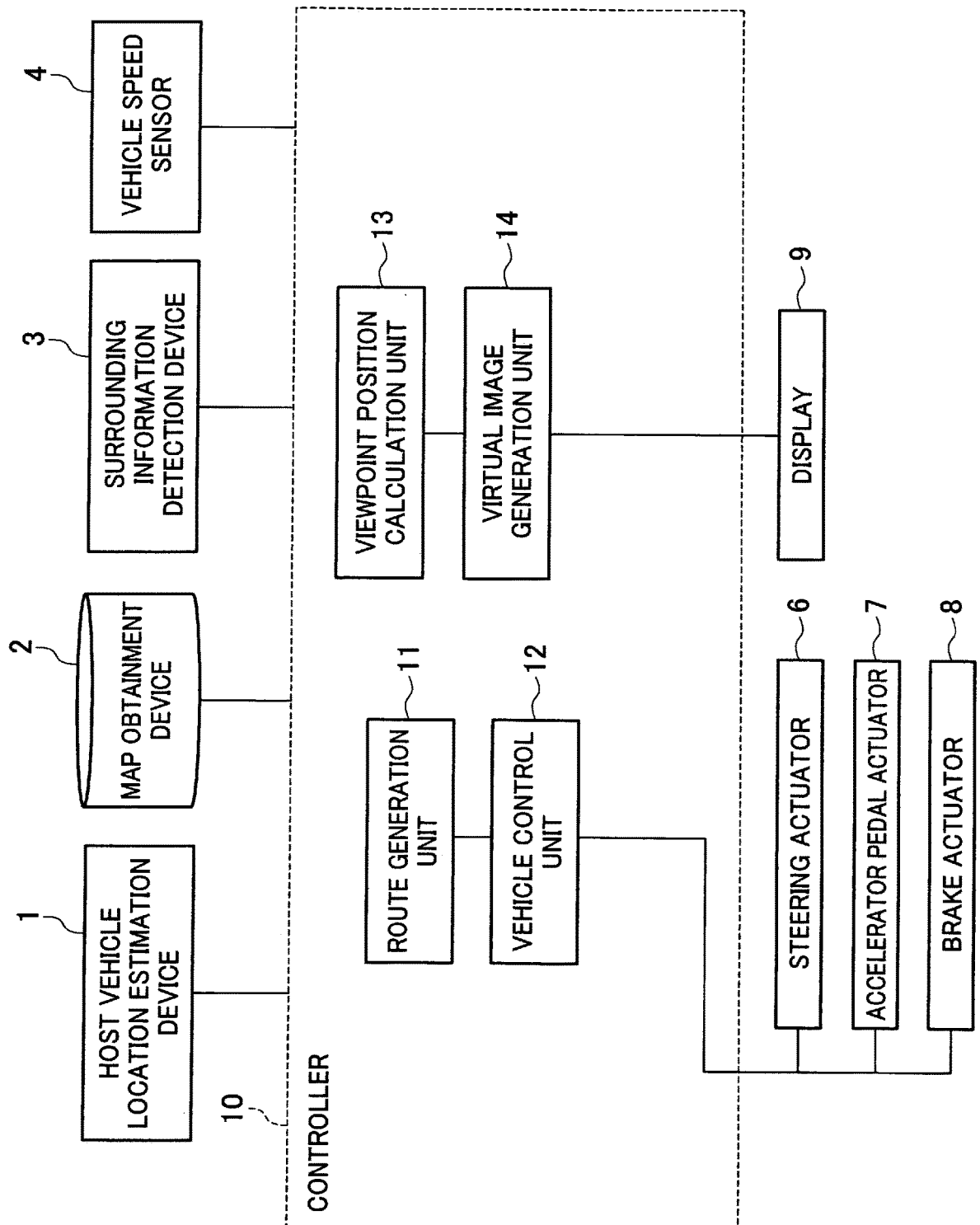
FIG. 1 is a configuration diagram of a surrounding vehicle display device according to an embodiment of the present invention.

Hereinafter, embodiments of the present invention are described with reference to the drawings. In the drawings, the same parts are indicated by the same reference signs and descriptions thereof are omitted.

(Configuration of Surrounding Vehicle Display Device)

A configuration of a surrounding vehicle display device according to this embodiment is described with reference to FIG. 1. The surrounding vehicle display device includes a host vehicle location estimation device 1, a map obtainment device 2, a surrounding information detection device 3, a vehicle speed sensor 4, a controller 10, various actuators 6 to 8, and a display 9. Although the surrounding vehicle display device is described as a device used in an automated driving vehicle with an automated driving function in this embodiment, the surrounding vehicle display device may also be applied to a vehicle with no automated driving function.

The host vehicle location estimation device 1 includes a location detection sensor for measuring an absolute location of the host vehicle such as a GPS (global positioning system) or an odometry mounted in the host vehicle. The host vehicle location estimation device 1 uses the location detection sensor to measure the absolute location of the host vehicle, that is, a location and orientation of the host vehicle with respect to a predetermined reference point. The host vehicle location estimation device 1 outputs the measured location information of the host vehicle to the controller 10.

The map obtainment device 2 obtains map information indicating a configuration of a road where the host vehicle travels. The map information obtained by the map obtainment device 2 includes information on the road configuration such as absolute locations of traffic lanes and connection relationships and relative location relationships between the traffic lanes. The map obtainment device 2 may have a map database storing the map information or may obtain the map information from an external map data server by cloud computing. Additionally, the map obtainment device 2 may obtain the map information through vehicle-to-vehicle communication and road-to-vehicle communication. The map obtainment device 2 outputs the obtained map information to the controller 10.

The surrounding information detection device 3 (information sensor) includes multiple different types of object detection sensors mounted in the host vehicle. The object detection sensors are, for example, a laser range finder, laser radar, millimeter-wave radar, camera, and so on. The surrounding information detection device 3 uses these object detection sensors to detect an object around the host vehicle. The surrounding information detection device 3 detects a moving object including another vehicle, a bike, a bicycle, and a pedestrian and a motionless object including a parking vehicle. For example, the surrounding information detection device 3 detects a location, orientation (yaw angle), size, speed, acceleration, jerk, deceleration, and yaw rate of the moving object and the motionless object with respect to the host vehicle. Additionally, the surrounding information detection device 3 detects a lane marking, traffic light, sign, and the like around the host vehicle. Moreover, the surrounding information detection device 3 may obtain the surrounding information through the vehicle-to-vehicle communication and the road-to-vehicle communication. The surrounding information detection device 3 outputs the detected information to the controller 10.

The vehicle speed sensor 4 detects a vehicle speed of the host vehicle. The vehicle speed sensor 4 outputs the detected vehicle speed of the host vehicle to the controller 10.

The controller 10 obtains the information from the host vehicle location estimation device 1, the map obtainment device 2, the surrounding information detection device 3, and the vehicle speed sensor 4. The controller 10 uses the obtained information to perform travelling control of the host vehicle automatically and generate a virtual image indicating another vehicle, a bike, a bicycle, a pedestrian, and the like around the host vehicle.

The controller 10 is a general-purpose microcomputer including a CPU (central processing unit), memory, and input-output unit. The microcomputer is installed with a computer program for functioning the microcomputer as an automatic traveling control device and a surrounding vehicle display device. The microcomputer executes the computer program to function as multiple information processing circuits included in the automatic traveling control device and the surrounding vehicle display device. Note that, although there is shown an example of implementing the multiple information processing circuits included in the automatic traveling control device and the surrounding vehicle display device by software herein, needless to say, it is also possible to implement the information processing circuits by preparing dedicated hardware for executing the following information processing. Additionally, the multiple information processing circuits may be formed of individual pieces of hardware.

The controller 10 includes a route generation unit 11, a vehicle control unit 12, a viewpoint position calculation unit 13, and a virtual image generation unit 14 as the multiple information processing circuits.

The route generation unit 11 generates a route to a destination that is set in advance by an occupant of the host vehicle. The route generation unit 11 outputs the generated route to the vehicle control unit 12.

The vehicle control unit 12 controls a steering actuator 6, an accelerator pedal actuator 7, a brake actuator 8, and the like using the information on the surroundings of the host vehicle to allow the host vehicle to automatically travel along the route obtained from the route generation unit 11.

The viewpoint position calculation unit 13 calculates a position and a direction of a virtual viewpoint. The virtual viewpoint is a viewpoint to look down the host vehicle from behind and above. Although the position of the virtual viewpoint is described as a position set on a central axis with respect to a vehicle-width direction of the host vehicle, the position of the virtual viewpoint is not limited thereto. The direction of the virtual viewpoint is an angle between a direction of a line of vision to look down the host vehicle from the position of the virtual viewpoint and a horizontal plane of the position of the virtual viewpoint. The viewpoint position calculation unit 13 outputs the calculated virtual viewpoint to the virtual image generation unit 14.

The virtual image generation unit 14 uses the information detected by the surrounding information detection device 3 and the like and the virtual viewpoint calculated by the viewpoint position calculation unit 13 to generate a virtual image so as to make an image of looking down from the virtual viewpoint. In other words, the virtual image generation unit 14 generates a virtual image that indicates the surroundings of the host vehicle as being viewed from above the host vehicle. The virtual image generation unit 14 outputs the generated virtual image to the display 9.

The display 9 is a device that is disposed close to a driver seat on an instrument panel to indicate to the occupant various kinds of information. The display 9 is, for example, formed of a liquid crystal panel and displays images of a speedometer, tachometer, and so on. Additionally, the display 9 displays the virtual image generated by the virtual image generation unit 14. Note that, the display 9 may include a head-up display that uses a window glass of the host vehicle (for example, windshield) as a display screen.

(Operation Example of Surrounding Vehicle Display Device)

Next, an operation example of the surrounding vehicle display device is described with reference to FIG. 2.

The viewpoint position calculation unit 13 calculates the position and the direction of the virtual viewpoint according to the vehicle speed of a host vehicle 20. As shown in FIG. 2, when the host vehicle 20 is automatically traveling at a low speed, the viewpoint position calculation unit 13 calculates a position P1 and the direction of the virtual viewpoint to make the virtual viewpoint relatively close to the host vehicle 20. On the other hand, when the host vehicle 20 is automatically traveling at a high speed, the viewpoint position calculation unit 13 calculates a position P2 and the direction of the virtual viewpoint to make the virtual viewpoint relatively far from the host vehicle 20.

When the host vehicle 20 is automatically traveling at a low speed, the virtual image generation unit 14 generates a virtual image 30 so as to make an image of looking down from the position P1 of the virtual viewpoint. As shown in FIG. 2, a display region of the virtual image 30 includes a region 20 m away from the host vehicle 20 in a traveling direction and a region 10 m away from the host vehicle 20 in an opposite direction of the traveling direction.

Additionally, when the host vehicle 20 is automatically traveling at a high speed, the virtual image generation unit 14 generates a virtual image 31 so as to make an image of looking down from the position P2 of the virtual viewpoint. As shown in FIG. 2, a display region of the virtual image 31 includes a region 100 m away from the host vehicle 20 in the traveling direction and a region 70 m away from the host vehicle 20 in the opposite direction of the traveling direction.

As shown by the virtual image 30 and the virtual image 31, when the vehicle speed of the host vehicle 20 is higher than a low vehicle speed, the display region of the virtual image 31 becomes wider than the display region of the virtual image 30 in a front region and a rear region around the host vehicle 20.

That is, when the vehicle speed of the host vehicle 20 is higher than a low vehicle speed, the viewpoint position calculation unit 13 changes the position of the virtual viewpoint from the position P1 to the position P2 to make the virtual viewpoint farther from the host vehicle 20 and additionally changes the direction of the virtual viewpoint.

As described above, when the vehicle speed of the host vehicle 20 is higher than a low vehicle speed, with the surrounding vehicle display device widening the display region of the virtual image, the occupant can grasp another vehicle, a bike, a bicycle, a pedestrian, and the like in a wide region around the host vehicle 20.

The scenes where the vehicle speed of the host vehicle 20 is a high speed may include a scene where the host vehicle 20 performs traffic lane change, for example. When the host vehicle 20 performs traffic lane change, it can be thought that the occupant wants to check another vehicle, a bike, a bicycle, a pedestrian, and the like in a wide area around the host vehicle 20. Specifically, it can be thought that the occupant wants to check whether there is a following vehicle coming close from behind on a traffic lane next to the traffic lane where the host vehicle 20 is traveling (a traffic lane to which the host vehicle 20 moves). Thus, in this embodiment, when the vehicle speed of the host vehicle 20 is higher than a low vehicle speed, the surrounding vehicle display device widens the display region of the virtual image of the front region and the rear region around the host vehicle 20 and displays the widened display region of the virtual image on the display 9. This allows the occupant to grasp another vehicle, a bike, a bicycle, a pedestrian, and the like behind the host vehicle 20 in a wide area and feel safe about the automated driving.

Figure 2:
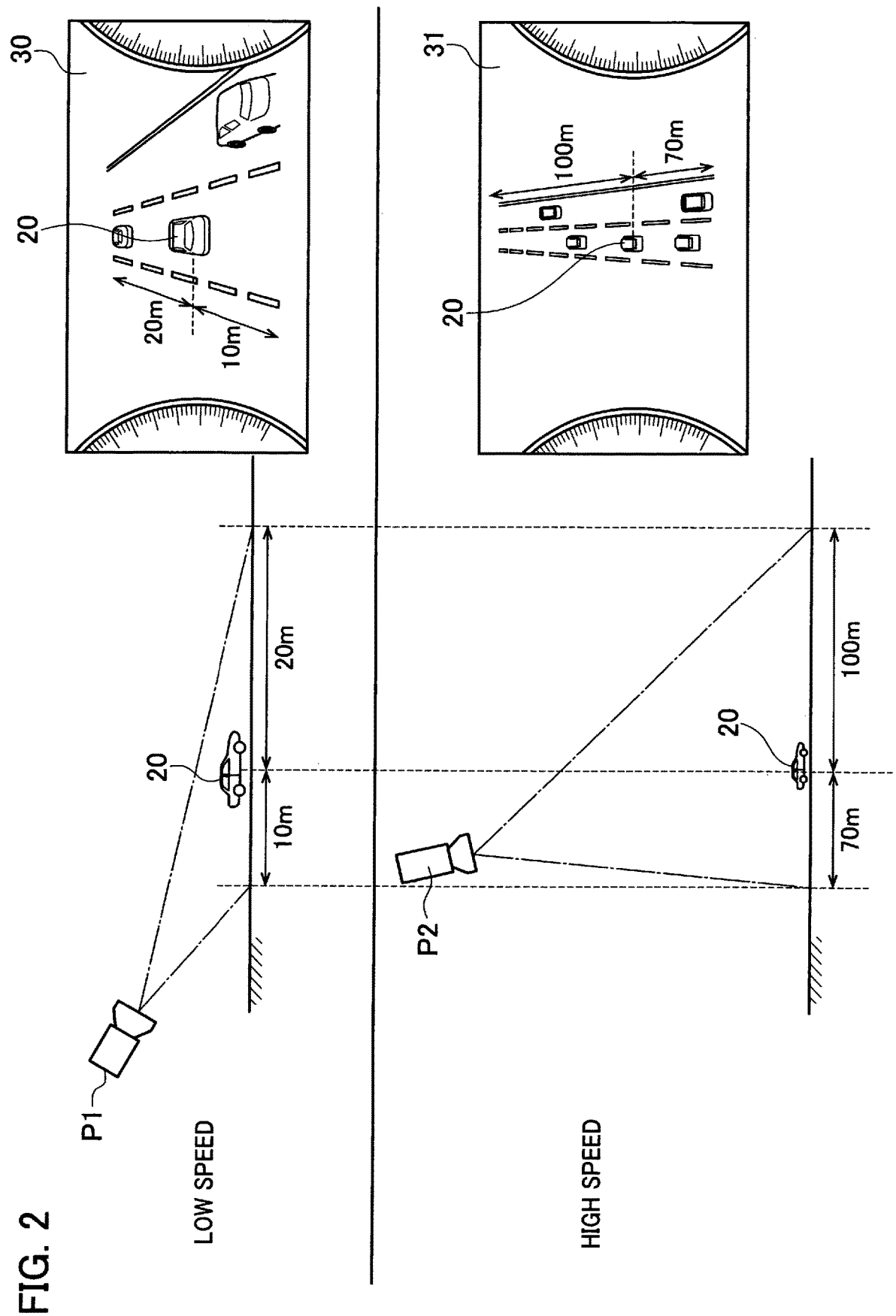
FIG. 2 is a diagram for describing an example of a display region of a virtual image according to the embodiment of the present invention.

Note that, although the viewpoint position calculation unit 13 calculates both the position and direction of the virtual viewpoint in the operation example shown in FIG. 2, it is not limited thereto. It is sufficient that the viewpoint position calculation unit 13 calculates at least either of the position and the direction of the virtual viewpoint. For example, if the viewpoint position calculation unit 13 sets the position of the virtual viewpoint to a position far from the host vehicle 20, the front region and the rear region around the host vehicle 20 on the virtual image are widened. Additionally, the viewpoint position calculation unit 13 can set the direction of the virtual viewpoint so as to widen the front region and the rear region around the host vehicle 20 on the virtual image. Moreover, the viewpoint position calculation unit 13 may change an angle of view and a focal length of the virtual viewpoint. That is, with the viewpoint position calculation unit 13 changing at least one of the features of the virtual viewpoint including the position, direction, angle of view, and focal length, the surrounding vehicle display device can widen the display region of the virtual image.

Figure 3:
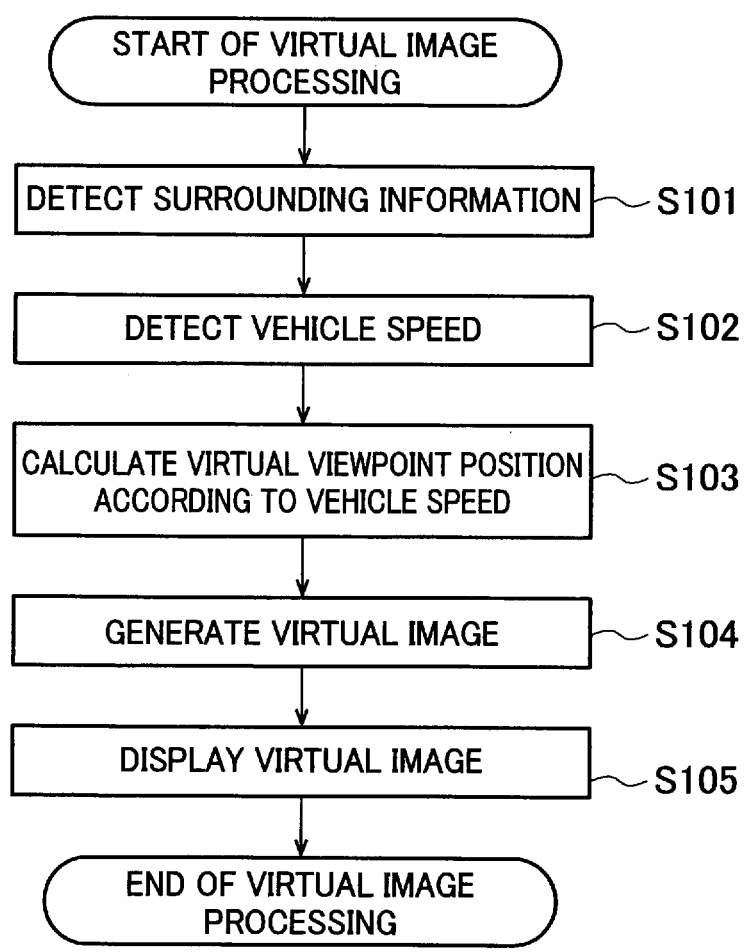
FIG. 3 is a flowchart for describing an operation example of the surrounding vehicle display device according to the embodiment of the present invention.

Next, an operation example of the surrounding vehicle display device is described with reference to a flowchart in FIG. 3.

In step S101, the map obtainment device 2 and the surrounding information detection device 3 detect the information on the surroundings of the host vehicle 20. For example, the map obtainment device 2 detects a configuration of the road where the host vehicle 20 travels. The surrounding information detection device 3 detects another vehicle, a lane marking, and the like around the host vehicle 20. Thereafter, the processing proceeds to step S102.

In step S102, the vehicle speed sensor 4 detects the vehicle speed of the host vehicle 20. Thereafter, the process proceeds to step S103.

In step S103, the viewpoint position calculation unit 13 calculates the position and the direction of the virtual viewpoint according to the vehicle speed of the host vehicle 20 detected in step S102. As shown in FIG. 2, when the host vehicle 20 is automatically traveling at a low speed, the viewpoint position calculation unit 13 calculates the position P1 and the direction of the virtual viewpoint to make the virtual viewpoint relatively close to the host vehicle 20. On the other hand, when the host vehicle 20 is automatically traveling at a high speed, the viewpoint position calculation unit 13 calculates the position P2 and the direction of the virtual viewpoint to make the virtual viewpoint relatively far from the host vehicle 20. Thereafter, the process proceeds to step S104.

In step S104, the virtual image generation unit 14 uses the information detected in step S101 and the position and the direction of the virtual viewpoint calculated in step S102 to generate the virtual images 30, 31 so as to make images of looking down from the virtual viewpoint. Thereafter, the process proceeds to step S105. In step S105, the display 9 displays the virtual images 30, 31 generated in step S104.

(Operations and Effects)

As described above, according to the surrounding vehicle display device of this embodiment, it is possible to achieve the following operations and effects.

The surrounding vehicle display device obtains the information on the surroundings of the host vehicle 20 and detects the vehicle speed of the host vehicle 20. The virtual image generation unit 14 uses the information on the surroundings of the host vehicle 20 obtained by the surrounding information detection device 3 and the like and the virtual viewpoint calculated by the viewpoint position calculation unit 13 to generate the virtual image indicating the surroundings of the host vehicle 20 being looked down from the above virtual viewpoint. When the detected vehicle speed is higher than a low vehicle speed, the surrounding vehicle display device widens the display region of the surroundings of the host vehicle 20 on the virtual image and displays the virtual image on the display 9. This allows the occupant to grasp another vehicle, a bike, a bicycle, a pedestrian, and the like in a wide region around the host vehicle 20.

Additionally, the surrounding vehicle display device widens the display region of the virtual image of the front region and the rear region around the host vehicle 20, that is, the display region of the virtual image in a front and rear direction of the host vehicle 20. This allows the occupant to grasp another vehicle, a bike, a bicycle, a pedestrian, and the like in a wide region in the front region and the rear region around the host vehicle 20.

Additionally, the surrounding vehicle display device widens the display region of the surroundings of the host vehicle 20 on the virtual image by changing at least one of the features of the virtual viewpoint including the position, direction, angle of view, and focal length. This allows the occupant to grasp another vehicle, a bike, a bicycle, a pedestrian, and the like in a wide region around the host vehicle 20.

The information on the surroundings of the host vehicle 20 is information on the moving object including at least another vehicle, a bike, a bicycle, and a pedestrian and the motionless object at least including a parking vehicle. Since the information is what the occupant wants to know, the surrounding vehicle display device can meet the need of the occupant by displaying the information on the virtual image.

Additionally, the surrounding vehicle display device according to this embodiment is used in an automated driving vehicle that performs traveling control automatically. This allows the occupant to grasp another vehicle, a bike, a bicycle, a pedestrian, and the like in a wide region around the host vehicle 20. Consequently, the occupant can feel safe about the automated driving.

Other Embodiments

Although the embodiment of the present invention is described above, the descriptions and the drawings as a part of the present disclosure should not be construed to limit the present invention. According to the present disclosure, various alternative embodiments, examples, and operational techniques will be apparent to those skilled in the art.

For example, the surrounding vehicle display device may change at least either of the position and the direction of the virtual viewpoint to make the display region of the virtual image wider as the vehicle speed of the host vehicle 20 becomes higher. With this linear widening of the display region of the virtual image according to the vehicle speed of the host vehicle 20, the display region of the virtual image is gradually widened. That is, since the display region of the virtual image is not suddenly widened, the occupant can naturally grasp the change of the display region of the virtual image and can feel safe about the automated driving.

Additionally, the surrounding vehicle display device may change at least either of the position and the direction of the virtual viewpoint to widen the display region of the virtual image when the vehicle speed of the host vehicle 20 becomes higher than a predetermined speed. This allows the occupant to easily grasp the change of the display region of the virtual image since the display region of the virtual image is changed based on the predetermined speed. Note that, the predetermined speed is stored in the controller 10 in advance. Only one speed or multiple different speeds may be stored as the predetermined speed. For example, the multiple and different predetermined speeds may be set as discrete speeds at every 10 km/h. Since this allows the display region of the virtual image to be gradually changed according to the speed, the occupant can easily grasp the change of the display region of the virtual image.

Additionally, the surrounding vehicle display device may make the display region of the virtual image wider as the predetermined speed stored in the controller 10 is higher. That is, when the vehicle speed of the host vehicle 20 becomes higher than the predetermined speed set to a high speed, the surrounding vehicle display device makes the display region of the virtual image wider than a case where the vehicle speed of the host vehicle 20 becomes higher than the predetermined speed set to a low speed. This allows the occupant to easily grasp the change of the display region of the virtual image and also grasp another vehicle, a bike, a bicycle, a pedestrian, and the like in a wide region around the host vehicle 20.

In this embodiment, as shown in FIG. 2, when the host vehicle 20 is automatically traveling at a low speed, the display region of the virtual image 30 includes the region 20 m away from the host vehicle 20 in the traveling direction and the region 10 m away from the host vehicle 20 in the opposite direction of the traveling direction. On the other hand, when the host vehicle 20 is automatically traveling at a high speed, the display region of the virtual image 31 includes the region 100 m away from the host vehicle 20 in the traveling direction and the region 70 m away from the host vehicle 20 in the opposite direction of the traveling direction. Although these distances are not limited, it is preferred to make an increase rate for widening the rear region around the host vehicle 20 greater than an increase rate for widening the front region around the host vehicle 20. For example, using FIG. 2 to give descriptions, the increase rate for widening the rear region around the host vehicle 20 is seven times (from 10 m to 70 m), while the increase rate for widening the front region around the host vehicle 20 is five times (from 20 m to 100 m). Like this, it is preferred to make the increase rate (seven times) for widening the rear region around the host vehicle 20 greater than the increase rate (five times) for widening the front region around the host vehicle 20. This makes it possible to satisfy the need of the occupant to check another vehicle, a bike, a bicycle, a pedestrian, and the like in the rear region around the host vehicle 20.

Additionally, as shown in FIG. 2, when the vehicle speed of the host vehicle 20 is a low speed, it is preferred to make the rear region around the host vehicle 20 on the virtual image 30 (10 m) smaller than the front region around the host vehicle 20 on the virtual image 30 (20 m). This is because, if the rear region around the host vehicle 20 is wider when the vehicle speed of the host vehicle 20 is a low speed, the host vehicle 20 and another vehicle behind the host vehicle 20 may be overlapped with each other on the virtual image 30. When the host vehicle 20 and the other vehicle overlap with each other like this case, it is impossible to recognize at a glance that which one of the overlapping vehicles is the host vehicle 20. Otherwise, the host vehicle 20 may be hidden by the other vehicle. For this reason, when the vehicle speed of the host vehicle 20 is a low speed, the surrounding vehicle display device makes the rear region around the host vehicle 20 on the virtual image smaller than the front region around the host vehicle 20 on the virtual image. This allows the surrounding vehicle display device to prevent the overlapping of the host vehicle 20 and the other vehicle on the virtual image 30. Note that, a specific speed of the low speed may be set properly based on a traffic environment and may be stored as a second predetermined speed different from the abovementioned predetermined speed in the controller 10 in advance.

Although enlargement of the display region in the traveling direction of the host vehicle 20 and the display region in the opposite direction of the traveling direction is described in this embodiment as shown in FIG. 2, it is not limited thereto. For example, in addition to the front and rear direction of the host vehicle 20, the surrounding vehicle display device may widen the display region in the vehicle-width direction of the host vehicle.

Figure 4:
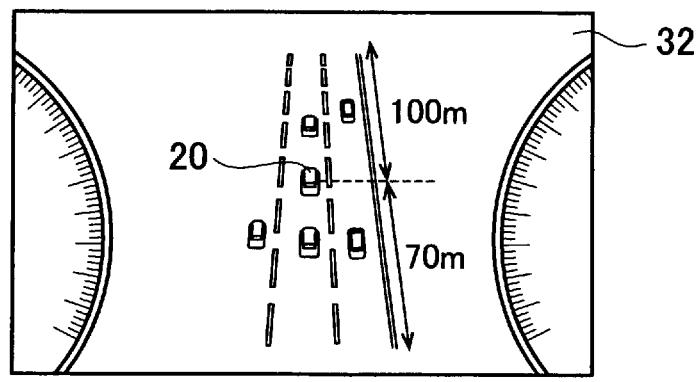
FIG. 4 is a diagram for describing another example of a display region of a virtual image according to an embodiment of the present invention.

Like a virtual image 32 shown in FIG. 4, when the vehicle speed is higher than a low vehicle speed, the surrounding vehicle display device may widen the display region not only in the front and rear direction of the host vehicle but also in the vehicle-width direction of the host vehicle 20. Comparing with the virtual image 31 shown in FIG. 2, the virtual image 32 displays another vehicle, a bike, and the like on three traffic lanes. This allows the occupant to grasp another vehicle, a bike, a bicycle, a pedestrian, and the like in a wide region around the host vehicle 20 and feel safe about the automated driving.

Additionally, the surrounding vehicle display device may widen the front region and the rear region around the host vehicle 20 on the virtual image when a vehicle speed of another vehicle traveling on the next traffic lane is higher than the vehicle speed of the host vehicle 20.

Note that, display areas of the virtual image 30 and the virtual image 31 on the display 9 may be either the same or different. For example, the surrounding vehicle display device may make the display area of the virtual image 31 greater than the display area of the virtual image 30 on the display 9. With the surrounding vehicle display device increasing the display area of the virtual image on the display 9 when the vehicle speed of the host vehicle 20 is higher than a low vehicle speed, the occupant can grasp another vehicle, a bike, a bicycle, a pedestrian, and the like in a wide region around the host vehicle 20 on a much larger virtual image.

REFERENCE SIGNS LIST

1 host vehicle location estimation device
2 map obtainment device
3 surrounding information detection device
4 vehicle speed sensor
9 display
10 controller
12 vehicle control unit
13 viewpoint position calculation unit
14 virtual image generation unit

The invention claimed is:
1. A surrounding vehicle display method, comprising:
obtaining information on surroundings of a host vehicle;
detecting a vehicle speed of the host vehicle;
using the obtained information on the surroundings of the host vehicle to generate a virtual image that indicates the host vehicle and the surroundings of the host vehicle as being viewed from above the host vehicle;
making a display region of a front region and a rear region around the host vehicle on the virtual image wide in response to determining that the detected vehicle speed is higher than a low vehicle speed; and
displaying the virtual image on a display, wherein
an increase rate for widening the rear region is greater than an increase rate for widening the front region,
setting a position of a virtual viewpoint looking down the host vehicle from behind and above to a first position when the detected vehicle speed is less than or equal to the low vehicle speed, and
in response to determining that the detected vehicle speed is higher than the low vehicle speed, making the display region of the front region and the rear region around the host vehicle on the virtual image wide, by setting the position of the virtual viewpoint to a second position higher than the first position in a vertical direction.

2. The surrounding vehicle display method according to claim 1, wherein,
the display region of at least the rear region around the host vehicle on the virtual image is made wider as the vehicle speed becomes higher.

3. The surrounding vehicle display method according to claim 1, wherein,
the display region of at least the rear region around the host vehicle on the virtual image is made wider in response to determining that the detected vehicle speed becomes higher than at least one predetermined speed.

4. The surrounding vehicle display method according to claim 3, wherein,
the display region of at least the rear region around the host vehicle on the virtual image is made wider as the predetermined speed is higher.

5. The surrounding vehicle display method according to claim 1, wherein,
the rear region around the host vehicle on the virtual image is smaller than the front region around the host vehicle on the virtual image when the detected vehicle speed is lower than a second predetermined speed.

6. The surrounding vehicle display method according to claim 1, wherein
a feature of an above virtual viewpoint is changed to make the display region of at least the rear region around the host vehicle on the virtual image wide.

7. The surrounding vehicle display method according to claim 1, wherein
the information on the surroundings of the host vehicle is information on a moving object including at least another vehicle, a bike, a bicycle, and a pedestrian and a motionless object including at least a parking vehicle.

8. The surrounding vehicle display method according to claim 1, wherein
the surrounding vehicle display method is used in an automated driving vehicle that performs travelling control of the host vehicle automatically.

9. The surrounding vehicle display method according to claim 1, wherein
setting a position of a virtual viewpoint looking down the host vehicle from behind and above to a first height, and an angle to a first acute angle when the detected vehicle speed is less than or equal to the low vehicle speed, in which the angle is formed between a direction of a line of vision looking down the host vehicle from the position of the virtual view point and a horizontal plane, and
in response to determining that the detected vehicle speed is higher than the low vehicle speed, making the display region of the front region and the rear region around the host vehicle on the virtual image wide, by setting the position of the virtual viewpoint to a second height higher than the first height in a vertical direction, and the angle to a second acute angle greater than the first acute angle.

10. The surrounding vehicle display method according to claim 1, wherein,
the display region of at least the rear region around the host vehicle on the virtual image is made wider in a linear fashion as the vehicle speed becomes higher.

11. A surrounding vehicle display device, comprising:
an information sensor that obtains information on surroundings of a host vehicle;
a vehicle speed sensor that detects a vehicle speed of the host vehicle;
a controller that uses the information obtained by the information sensor to generate a virtual image that indicates the host vehicle and the surroundings of the host vehicle as being viewed from above the host vehicle; and
a display that displays the virtual image, wherein
the controller makes a display region of a front region and a rear region around the host vehicle on the virtual image wide in response to determining that the detected vehicle speed is higher than a low vehicle speed, and
an increase rate for widening the rear region is greater than an increase rate for widening the front region,
the controller sets a position of a virtual viewpoint looking down the host vehicle from behind and above to a first position when the detected vehicle speed is less than or equal to the low vehicle speed, and
in response to determining that the detected vehicle speed is higher than the low vehicle speed, the controller makes the display region of the front region and the rear region around the host vehicle on the virtual image wide, by setting the position of the virtual viewpoint to a second position higher than the first position in a vertical direction.

\* \* \* \* \*